US011959621B2

(12) United States Patent
Abercrombie, III et al.

(10) Patent No.: US 11,959,621 B2
(45) Date of Patent: Apr. 16, 2024

(54) ILLUMINATION SYSTEM WITH A PLURALITY OF MOTION DETECTORS

(71) Applicant: Battle Born LLC, Henderson, NV (US)

(72) Inventors: James S. Abercrombie, III, Greenwich, CT (US); Nicholas J. Day, Henderson, NV (US); Ayrton J. Day, Henderson, NV (US)

(73) Assignee: Battle Born LLC, Henderson, NV (US)

( * ) Notice: Subject to any disclaimer, the term of this patent is extended or adjusted under 35 U.S.C. 154(b) by 0 days.

(21) Appl. No.: 17/714,811

(22) Filed: Apr. 6, 2022

(65) Prior Publication Data
US 2022/0325881 A1 Oct. 13, 2022

Related U.S. Application Data

(60) Provisional application No. 63/174,127, filed on Apr. 13, 2021.

(51) Int. Cl.
*F21V 23/04* (2006.01)
*F21V 3/00* (2015.01)
*F21V 33/00* (2006.01)
*G06F 3/16* (2006.01)
*H04R 1/02* (2006.01)
*H04R 3/00* (2006.01)
*F21Y 115/10* (2016.01)

(52) U.S. Cl.
CPC ............ *F21V 23/0471* (2013.01); *F21V 3/00* (2013.01); *F21V 33/0056* (2013.01); *G06F 3/165* (2013.01); *H04R 1/028* (2013.01); *H04R 3/00* (2013.01); *F21Y 2115/10* (2016.08); *H04R 2420/07* (2013.01)

(58) Field of Classification Search
CPC ............ F21V 23/0471; F21V 33/0056; F21V 33/0052; F21V 23/0442; F21V 23/0464; F21V 23/0478
USPC .......................................................... 362/276
See application file for complete search history.

(56) References Cited

U.S. PATENT DOCUMENTS

| 5,721,471 | A |   | 2/1998 | Begemann et al. |
| 6,149,283 | A | * | 11/2000 | Conway ................ F21V 7/0008 |
|           |   |   |         | 362/249.05 |
| 6,390,647 | B1 |  | 5/2002 | Shaefer |
| 6,948,831 | B1 | * | 9/2005 | Naqvi ....................... F21S 8/02 |
|           |   |   |         | 362/802 |
| 7,264,377 | B2 |  | 9/2007 | Cooper et al. |
| 7,588,349 | B2 | * | 9/2009 | Yen ....................... F21V 23/0442 |
|           |   |   |         | 362/183 |

(Continued)

*Primary Examiner* — Ismael Negron
(74) *Attorney, Agent, or Firm* — Goodwin Procter LLP

(57) ABSTRACT

An illumination system includes a housing with a top cover, a side wall, a bottom portion, and a light diffusing lens integrated into the bottom portion. The illumination system includes a light source within the housing and optically coupled to the lens, light control components located along the side wall of the housing, and motion sensing components disposed along the side wall of the housing and configured to collectively detect motion within an approximately 360 degree planar field of view of the light emitting device. The motion sensing components are configured to trigger the light source in a direction of a planar field of view from the individual motion sensing component being triggered. The system includes an audio device for providing an audio signal when any one of the motion sensing components is triggered.

11 Claims, 2 Drawing Sheets

(56) References Cited

U.S. PATENT DOCUMENTS

| | | | |
|---|---|---|---|
| 7,604,378 B2 | 10/2009 | Wolf et al. | |
| 7,618,150 B2 * | 11/2009 | Chien | H04N 5/23241 |
| | | | 362/249.02 |
| 7,810,985 B2 | 10/2010 | Chien | |
| 8,104,928 B1 * | 1/2012 | Horn | F21V 21/30 |
| | | | 362/372 |
| 8,128,274 B2 | 3/2012 | Chien | |
| 8,461,510 B2 | 6/2013 | Williams et al. | |
| 9,157,589 B2 | 10/2015 | Chien | |
| 9,310,060 B2 | 4/2016 | Stolte et al. | |
| 10,041,639 B1 | 8/2018 | Thompson et al. | |
| 10,264,170 B2 * | 4/2019 | Chien | G03B 15/05 |
| 10,330,279 B2 * | 6/2019 | Stolte | F21V 23/045 |
| 10,508,784 B2 | 12/2019 | Chien | |
| 10,677,432 B2 | 6/2020 | Chien | |
| 10,773,778 B1 * | 9/2020 | Shaffer | B63B 45/02 |
| 2006/0250789 A1 * | 11/2006 | Coushaine | F21V 15/01 |
| | | | 362/157 |
| 2008/0204258 A1 | 8/2008 | Dayton et al. | |
| 2011/0292643 A1 * | 12/2011 | Chen | F21L 4/08 |
| | | | 362/183 |
| 2012/0293997 A1 * | 11/2012 | Zaderej | F21V 15/01 |
| | | | 362/235 |
| 2015/0243143 A1 * | 8/2015 | Chen | G08B 13/19617 |
| | | | 348/151 |
| 2017/0363276 A1 * | 12/2017 | Chien | F21V 5/04 |

* cited by examiner

ILLUMINATION SYSTEM WITH A PLURALITY OF MOTION DETECTORS

CROSS-REFERENCE TO RELATED APPLICATIONS

This application claims priority to and the benefit of U.S. Provisional Application No. 63/174,127 titled "Circular Motion Detector and Light Source" and filed Apr. 13, 2021, which is incorporated herein by reference in its entirety.

TECHNICAL FIELD

The invention relates generally to a light source, and, more specifically, to a circular light emitting device designed to be placed on a floor or other surface so that it disperses or sheds light in 360 degrees of planar lamina direction upon the detection of nearby motion.

BACKGROUND

Traditionally low light assistance for navigating dark bedrooms and hallways would be provided by a night light. Common complications with this solution are solved or refined with the invention.

A common problem with the traditional method is the light is always on or the brightness is nonadjustable. In this case the light is drawing power 24 hours a day. With the light always on it may make it difficult for users to sleep, disrupts melatonin production, or become a distraction if placed in a bedroom or hallway. Some night lighting solutions do include motion sensing so that the light can be activated upon the sensing of human motion. However, these devices only sense for motion in a single direction and are limited to a very narrow field of view (cone like field of view).

Another difficulty with a traditional night light is the requirement for use of a power socket. This limits the location the product can be used. If the product does not provide or is not intended to be used with an extension from the outlet it will be limited to a maximum light distribution of 180-degrees or (semispherical distribution) because of the plane which it is affixed to. In addition, the light is unlikely to be shed in the exact location where it is required, thereby failing to meet its primary objective. Additionally, the use of a power socket location renders the socket unusable for other uses, with some additional arrangement being required.

Another failure of traditional night lighting or lighting on demand systems is that they may not produce the type of lighting required. The light type is typically fixed and does not offer the ability to adjust the warmth or color as needed.

Another negative of traditional night lighting or lighting on demand is the temporary visual impairment resulting from dark/light adaption of a direct light source.

Another application of low light assistance is the lighting for home theaters and media rooms which are optimized to prevent screen washout and reflections, but with enough low light assistance for moving around freely in and out of the room without hazard or inconvenience. Common complications with this solution are solved or refined with the invention.

A common problem for home theater quality is that the location of the viewing screen is in preexisting living rooms, dens, and bedrooms that are not well suited for media. Rather than indirect floor lighting, typical light sources are on tables, walls, and ceilings that interfere with the viewing experience creating screen washout and mirror-like reflections.

Retrofitting preexisting rooms is another obstacle for traditional home theater lighting. Retrofitting requires professional installation that is a complicated with costly integration using smart remotes, fixed lighting fixtures, and wiring through existing walls, ceilings, and floors.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

A circular motion detection system having a light source is presented. In some embodiments, the circular motion detection system can include a circular housing having a top portion, side walls and a bottom portion including a light diffusing lens. In some embodiments, the light source can be located within the circular housing. In some embodiments, light control components can be located along the side walls of the circular housing. In some examples, the light control components can be configured to adjust one or more properties of the light source. In some embodiments, the one or more properties of the light source can include intensity, warmth, color, duration, and direction. In some embodiments, one or more motion sensing components can be disposed along the side wall of the circular housing. In some examples, the motion sensing components can be configured to collectively detect motion within an approximately 360 degree planar field of view of the light emitting device. In some examples, the motion sensing components can be configured to trigger the light source to emit light through the light diffusing lens in a planar field of view from the individual motion sensing component which detected the movement, e.g., or in 360 degree planer field of view. In some embodiments, the circular motion detection system can include an audio device. In some examples, the audio device can be located within the circular housing. In some examples, the audio device can be configured to provide an audio signal triggered by at least one motion sensing component. In some embodiments, the circular motion detection system can be referred to as a light emitting device, among other terms.

Various embodiments of the system can include one or more of the following features.

In some embodiments, of the one or more motion sensing components can include at least 3 motion sensing components. In some embodiments, the one or more motion sensing components can each be located equidistantly spaced apart around the side wall of the circular motion detection system. In some embodiments, the light control components can include an electrical component such as a potentiometer and/or a rotary potentiometer. In some embodiments, the bottom portion of the circular motion detection system can be transparent. In some embodiments, the side wall of the circular motion detection system can include a height of less than approximately 2 inches. In some embodiments, the circular motion detection system can include a battery power source located within the circular housing. In some embodiments, the circular motion detection system can be configured to wirelessly connect to one or more other circular motion detection systems and/or one or more control devices. In some embodiments, the one or more other circular motion detection systems can include a mute switch located along the side wall of the circular motion detection system. In some examples, the mute switch can be configured to turn on or turn off an audio signal from the circular motion detection system. In some embodiments, the light source can include one or more light emitting diodes (LEDs). In some embodiments, the light source can be configured to emit light using a pulse width modulation scheme, among other schemes and/or techniques. In some embodiments, the one or more motion sensing components can be configured trigger the light source to emit light through the diffusing lens from more than one of the plurality of motion sensing components.

The above and other preferred features, including various novel details of implementation and combination of events, will now be more particularly described with reference to the accompanying figures. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

Figure 1:
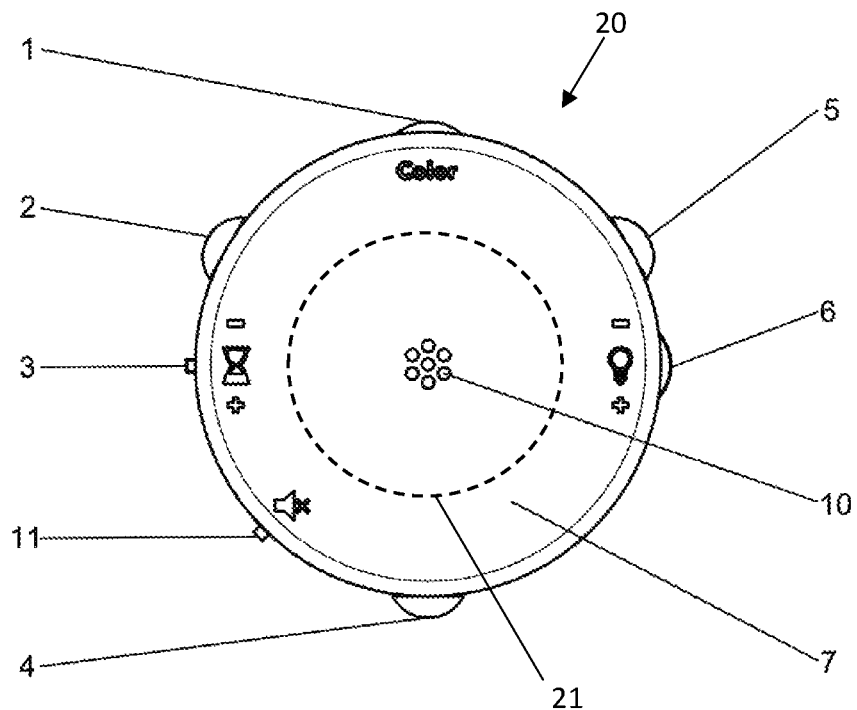
FIG. 1 illustrates a top view of a circular motion detector and light source, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Alternative solutions for motion sensing technology of a lighting device can require assembly and installation by a user. Such solutions can include a motion sensing module having a light source, e.g., an LED strip, which may or may not be configured to be power-socket mounted. In some examples, such a motion sensing module can require the user to unreliably position the motion sensing module towards an active detection area using an adhesive. Such an adhesive can fail after a long period of use, and can limit a detection area of the motion sensing module to 180-degrees or less. In some examples, provided a motion sensing module mounted on a power outlet within a user's bedroom, there is a possibility the motion sensing module may be inadvertently triggered due to a user's movement during sleep. Such a configuration can cause issues such as turning on the light source of the motion sensing module when it is not needed, potentially waking the user. Other issues can include unnecessary power consumption by the motion sensing module, due to the motion sensing module being inadvertently triggered by the user's movement during sleep.

Furthermore, other alternative solutions for motion sensing technology can also be limited in their placement locations and have limited directional sensing, which may make the motion sensing solution unsuitable to be used as signaling devices that report motion detected in a desired area. Also, other alternative solutions such as traditional night light solutions, may not be suitably equipped with an audible transducer that, together with a light pulse, would provide a signal, alarm, or notification of motion in a placement area to provide a user with a desirable notification.

Thus, there is a need for a circular motion detection system having a light source (e.g., a light emitting device) that 1) that can be triggered by motion sensing in full 360 degrees of planar lamina direction, 2) provides a predetermined and adjustable light output in full 360 degrees of planar lamina direction, when there is a need. The adjustability being in the form of on time, color, hue, and warmth. 3) that is autonomous and portable and can be placed without restriction on a floor or other surface and under furniture or other objects out of sight preventing vision impairment from dark/light adaption. 4) does not require assembly or installation, 5) can be used as an audio visual signaling device, and 6) switches off after motion is no longer detected within a predetermined time setting allowing the body to naturally produce melatonin 7) with further additional functions such as networkability, rechargeability, and being waterproof.

Embodiments of the invention provide an autonomous, battery-powered, portable, 360-degree planar lamina motion sensing, and light distributing device for low-light, and remote environments where enhanced visibility, decorative lighting or motion signaling is required. The invention further provides a device having a particular form factor (or within a range of form factors) such that it can be placed underneath low-clearance objects (e.g., furniture). As such, the device remains hidden from view or disturbance while providing instantaneous indirect/non-blinding light to the dynamic area in which or near where it is placed. The device is capable of being set to a custom level of brightness and color setting as well as the duration of its on time, after motion has been detected.

The invention addresses the shortcomings described above, as well as others, by providing A) motion sensing technology, B) light sensor, and C) brightness control. The motion and light sensing technology allow for the light to trigger immediately when light is needed, in order to 1) conserve energy when it is not required (i.e., when sufficient ambient light exists the light sensor will prevent unnecessary activation, and 2) only be active while there is a need for the light. This is achieved by triggering the light via a motion sensor either Passive Infrared, Radar or other motion sensing technology, for example audio noise, vibration or other. Once triggered, the unit further can be adjusted to set the on time for which the user would like the light to remain lit. If the light is in the active condition, and the sensing function subsequently detects motion again, the timer will be reset to restart the countdown thereby allowing the light to remain on. This condition will repeat allowing the light to remain active, until no further motion has been detected within the time out setting.

The device can be completely free standing and portable and thus is not dependent upon an external power source. It can be moved to any location and in some cases can be controlled via one or more user controls incorporated within and on the device and/or wirelessly through a personal electronics device (e.g., an application on a smartphone connected to the same wireless network). Once set and placed the device is completely autonomous and requires no user supervision or interaction (other than detecting the presence of motion).

In one aspect, the device can be placed under a bed or some other furniture or object having a low profile or clearance. In instances in which the device includes multiple sensors having a 360 degree field of detection, it can easily be placed/installed without the need for alignment of the device or individual sensors.

In some embodiments, the device includes audio/visual signaling, alarm and/or notification features such that it emits an audible signal together with the light. In one particular arrangement the light "on time" can be set to a short duration so that merely alerts the user of motion within the area in which the device has been placed.

A Circular Motion Detector and Light Source

Figure 2:
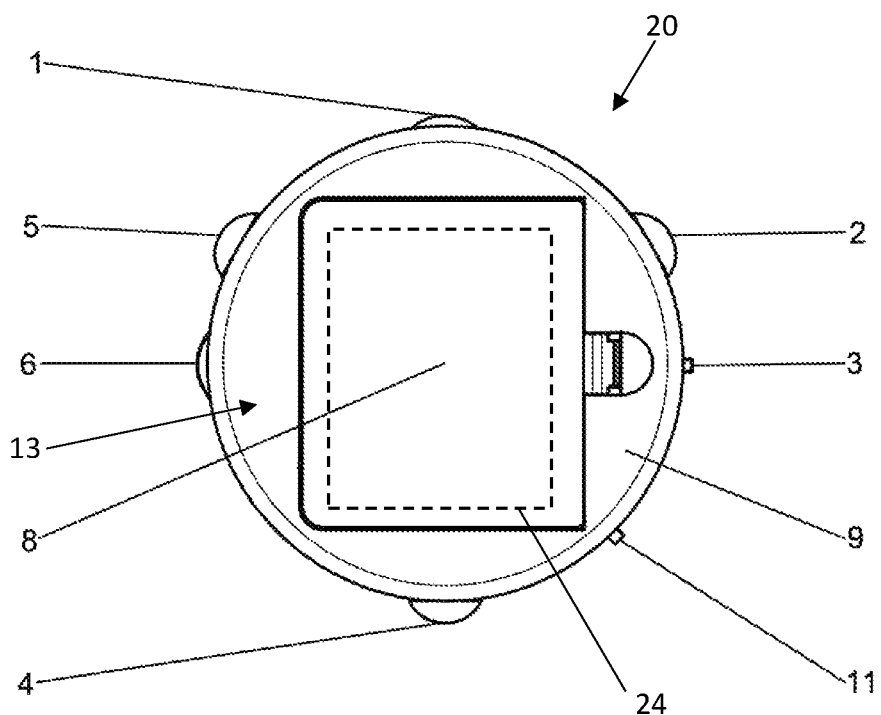
FIG. 2 illustrates bottom view of a circular motion detector and light source, according to some embodiments.
Figure 3:
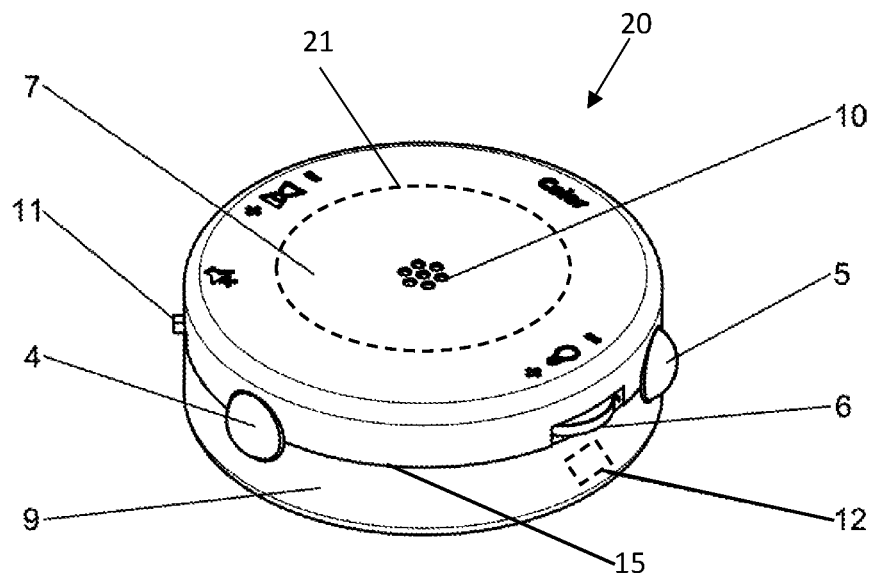
FIG. 3 illustrates an isometric view of a circular motion detector and light source, according to some embodiments.
Figure 4:
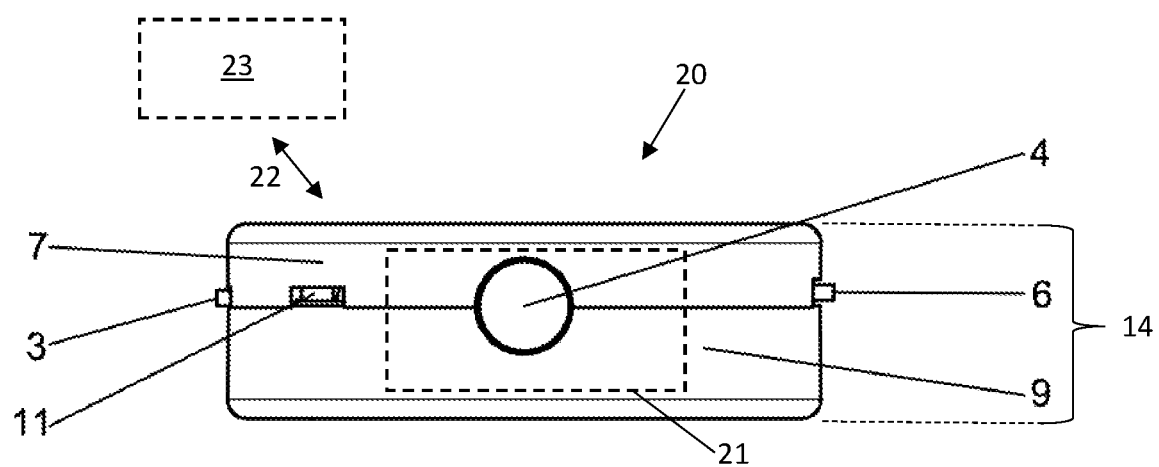
FIG. 4 illustrates is a side view of a circular motion detector and light source, according to some embodiments.

A circular motion detector and light source is disclosed. Referring to FIGS. 1-4, structural components of the circular motion detector and light source are presented, according to some embodiments. Additionally, as used herein, the circular motion detector and light source can also be referenced as a circular light emitting device. Furthermore, like reference numbers refer to similar or the same components within the figures. For example, a motion sensing component 4 is shown in FIGS. 2-4 and can refer to the same motion sensing component 4 in FIG. 1.

Referring to FIG. 1, a top view of a circular motion detector and light source 21 is presented, according to some embodiments. As shown, the circular light emitting device 20 can include motion sensing components 2, 4 and 5. In some embodiments, the motion sensing components 2, 4, 5 can be used to achieve a full sensing and/or motion detection range. In some embodiments, although 3 motion sensing components are shown, there can be one or more motion sensing components used. In some examples, there can be one, two, three or more motion sensing components used. In some embodiments, the motion sensing components can be placed equidistantly spaced around a side wall of the circular light emitting device 20. In some examples, the motion sensing components 2, 4, 5 can be placed equidistantly spaced around the circular light emitting device 20, e.g., as shown in FIG. 1. In an example, the motion sensing components 2, 4, 5 can detect the movement of a person, animal or other object within 360 degree planar field of view of the circular light emitting device 20. The motion sensing components 2, 4, 5 can be configured to trigger the circular light emitting device 20 to emit light when movement is detected. In an example, when one or more of the motion sensing components 2, 4, 5 detects movement, light can be emitted from the circular light emitting device 20 in all directions and/or 360 degrees from the device, or some fraction thereof (e.g., 90 degrees). In some embodiments having a single motion sensing component, e.g., where only one of 2, 4 or 5, detects movement, light can be emitted from the device 20 at the location of the device 20 in the planar field of view of the motion sensing component 2, 4, or 5 which detected the movement. In an example, provided motion sensing component 2 detected movement, the circular light emitter device 20 can project or emit light in the planar field of view of the motion sensing component 2. In the same example, no light would projected from the device 20 in the planar field of view of the motion sensing components 4 and 5. In some embodiments, a combination of at least two sensors can be used for turning on or emitting light from the circular light emitting device 20. For example, when movement is detected from the motion sensing component 2 and 4 but not the motion sensing component 5, light can be emitted in the vicinity or within the planar field of view of motion sensing component 2 and 4 but no light is emitted within the planar field of view of motion sensing component 5. In some embodiments, the circular light sensing device 20 can be configured to detect movement along a range of approximately 90-360 degrees around the device 20 using the motion sensing components 2, 4 and 5. In the same embodiment, even if the orientation of the circular light sensing device 20 is changed and/or moved, the circular light sensing device 20 can still cover a broad and/or desired area, e.g., a 360 degree area. Furthermore, an example application can include setting the device nearby a pet access door, or a staircase for a visually impaired user where a visual (e.g., light) signal or an audible signal may be helpful. In one example, when a pet enters or leaves a door the device 20 can trigger and act as a signaling device, by emitting an audible signal and/or a pulse of light for duration set by the user.

Referring again to FIG. 1, the circular light emitting device 20 can include various light control components. In an example, the circular light emitting device 20 can include a first rotary potentiometer 1. In some examples, the first rotary potentiometer 1 can be configured to allow a user to adjust the warmth and/or color of the light emitted from the circular light emitting device 20. In some embodiments, a multi-position switch 3 can also be included that allows the user to turn the circular light emitting 20 completely "off" and/or select a duration the circular light emitter device 20 stays "on" once triggered. In some embodiments, the circular light emitting device 20 can include a second rotary potentiometer 6, as shown. In some embodiments, the second rotary potentiometer 6 can be used to control the "on" state of the circular light emitting device 20. In one example, the second rotary potentiometer 6 can be used to control the light intensity and/or brightness of the circular light emitting device 20. In some embodiments, the circular light emitting device 20 can be configured to adjust the light temperature between warm and cool tones and the color can be selected through the full color spectrum. In some examples, adjusting the light temperature of the circular light emitting device 20 can allow the user to adjust and customize the intensity, warmth, and color of the light to meet a user's desired configuration. Additionally, the user can control and/or adjust the brightness and/or light intensity, e.g., using the second rotary potentiometer 6, to define the intensity of the light provided to avoid a sudden source of bright light in the dark or similar low light conditions. In some examples, adjusting the brightness and/or light intensity, using the second rotary potentiometer 6 can be particularly useful in very dark areas where only the minimum amount of light is required to provide safe conditions. In some embodiments, since the light contemplated is produced from Light Emitting Diodes (LED) 21, a pulse width modulation scheme can be used to control the intensity of the output by adjusting the duration of the power on pulses without reducing the voltage which may be required to drive the LEDs 21.

Referring yet again to FIG. 1, the circular light emitting device 20 can include audio components. In an example, the circular light emitting device 20 can include a speaker 10. In some examples, as shown in FIG. 1, the speaker 10 can be positioned at a top portion of the device 20. In some embodiments, a mute switch 11 can be included to allow the user toggle, e.g., turn "on" or "off", an audible input/output. In some embodiments, the circular light emitting device 20 can also include top cover 7 at the top portion of the circular light emitting device 20. In an example, the lid 7 can include holes for the speaker 10, as shown. In one example, the circular light emitting device 20 can include an audible transducer. In some examples, the mute switch 11 can be used to select an option for audible signaling together with a light pulse. In some examples, the circular light emitting device 20 can house and/or include the audible transducer and/or the mute switch 11 inside it.

Referring to FIG. 2, a bottom view of the circular motion detector and light source from FIG. 1 is presented, according to some embodiments. In some embodiments, the circular light emitting device 20 can also include a bottom portion 9. In some examples, at the bottom portion 9, the circular light emitting device 20 can include a battery housing 13, as shown. In some examples, batteries can be stored and/or housed within the battery housing 13. In some examples, a battery cover 8 can be included at the battery housing 13 of the circular light emitting device 20. In some embodiments, the bottom portion 9 can have a dual purpose, e.g., can serve as a light defusing lens and/or serve as the bottom half of the circular light emitting device 20. In some embodiments, the bottom portion 9, can include a transparent material. In some embodiments, the bottom portion 9, can include a lens configured to emit light in a planar lamina direction. In some examples, the bottom portion 9, can include a lens configured to emit light in 360 degrees, or in select directions, of a planar lamina direction immediately upon the detection of nearby motion.

Referring to FIG. 3, an isometric view of the circular motion detector and light source 21 from FIGS. 1 and 2 is presented, according to some embodiments. In some embodiments, a light sensor 12 can be included within the bottom portion 9 of the circular light emitting device 20. In some embodiments, the light sensor 12 can be located within the bottom portion 9, where the bottom portion 9 can allow and/or be configured to pass light through the bottom portion 9 to the light sensor 12. In some embodiments, the bottom portion 9 can allow light to be detected by the circular light emitting device 20 from all directions, e.g., in 360 degrees around the device. In some embodiments, the bottom portion can include a lens and/or any applicable transparent material. In some embodiments, the device 20 can be configured to sense motion in all directions and/or provide for 360-degree planar lamina radial coverage, e.g., provide for a 360-degree planar lamina radial motion detection. In some examples, the device 20 can be configured to detect motion from multiple directions. In some examples, the device 20 can placed under beds, cribs, chairs, desks, and/or other pieces of furniture where indirect light can emanate from the device 20 along the floor to assist with floor illumination. In the same example, the device 20 placed under a piece of furniture can also be able to sense motion from any side to trigger light at the corresponding side to assist with floor illumination. Thus, in some examples, the circular light emitting device 20 can be placed in any orientation and still receive light from all directions and/or in directions where a user is sensed or where a user may require illumination, even if there may be obstacles or obstructions around the device 20. In a same example, the circular light emitting device 20 can be orientation-agnostic.

Referring to FIG. 4 a side view of the circular motion detector and light source 21 from FIGS. 1-3 is presented, according to some embodiments. In some embodiments, the circular light emitting device 20 can have a height 14. In some examples, the height 14 can be less than or equal to approximately 2 inches. In some examples, the circular light sensing device 20 can have a height 14 that is less than or equal to approximately 1 inch. In some examples, such a height 14 or low profile capability, can allow for the circular light sensing device 20 to be configured to be placed under low clearance objects. In some examples, having a height 14 that is less than approximately 2 inches or less than approximately 1 inch can allow for placement under low clearance objects such as furniture.

Additional Configurations

In some embodiments, the circular light emitting device 20 can be configured to communicate 22, e.g., via a network, with other devices 23. In some examples, multiple circular light emitting devices can be placed throughout a building where each circular light emitting devices can wirelessly communicate 22 and/or connect to each other circular light emitting device defining and/or creating a network of circular light emitting devices. In the same example, one or more devices 23 of the network of circular light emitting devices can trigger other circular light emitting devices within the network to illuminate a user's path, e.g., illuminating a user's walking path down a corridor of the building. In some examples, a row of one or more devices 23 within the network of circular light emitting devices can trigger each other device to illuminate the user's path. In some embodiments, the user can use a personal electronics device, e.g., a cellphone, tablet, and/or any other type of personal electronics device, to wirelessly control the functions of one or more devices 23 within the network of circular light emitting devices. In some embodiments, one or more devices in the network of circular light emitting devices can be configured to communicate 22 and/or connect to one or more other circular light emitting devices. In some embodiments, one or more devices 23 in the network of circular light emitting devices can be configured to communicate 22 and/or connect to one or more control devices 23. In some examples, a control device can include a computer, mobile phone, tablet and/or any other type of control device.

In some embodiments, the circular light emitting device 20 can include a battery and/or a rechargeable battery 24. In some embodiments, using a rechargeable battery can allow the user to save on the cost of deposable batteries. In some embodiments, the battery and/or rechargeable battery can be treated for, placed in a protective package and/or insulated from water (e.g., the battery and/or rechargeable battery can be waterproofed).

In some embodiments, the circular light emitting device 20 can include waterproofing. In some examples, the circular light emitting device 20 can include a gasket 15 and/or an o-ring placed between the top portion, e.g., the top cover 7, and the bottom portion 9. In some embodiments, the gasket 15 and/or o-ring can be configured to provide waterproofing for the circular light emitting device 20. In one example, the gasket 15 and/or an o-ring located between the top portion/top cover 7 and the bottom portion 9, can provide for an air-tight seal between the top portion/top cover 7 and the bottom portion 9, e.g., thus preventing water from entering the circular light emitting device 20. In some embodiments, waterproofing can allow for placement of the circular light emitting device 20 at locations that may otherwise allow for the device 20 to be susceptible to water damage.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. An illumination system, comprising:
    a circular housing comprising:
        a top cover;
        a side wall;
        a bottom portion; and
        a light diffusing lens integrated into the bottom portion;
    a light source located within the circular housing and optically coupled to the light diffusing lens;
    light control components located along the side wall of the circular housing, the light control components for controlling at least one of the intensity, warmth, color, or duration of the light source;
    a plurality of motion sensing components disposed along the side wall of the circular housing, the motion sensing components collectively detecting motion within a 360 degree planar field of view of the light emitting device and, and upon detecting motion, triggering the light source to emit light through the light diffusing lens in a direction of a planar field of view from the individual motion sensing component being triggered which detected the movement;
    a light sensor located within the bottom portion, wherein the bottom portion allows light to pass through the entire bottom portion to be received by the light sensor;
    a gasket located between the top cover and the bottom portion, wherein the gasket seals a region between the top cover and the bottom portion, and wherein the seal is air-tight; and
    an audio device located within the circular housing, the audio device emitting an audio signal when any one of the sensing components is triggered.

2. The illumination system of claim 1, wherein the plurality of motion sensing components comprises at least 3 motion sensing components and wherein the components are equidistantly spaced around the side wall.

3. The illumination system of claim 1, wherein the light control components comprises a potentiometer.

4. The illumination system of claim 1, wherein the bottom portion is transparent.

5. The illumination system of claim 1, wherein the height of the side wall is less than approximately 2 inches.

6. The illumination system of claim 1, further comprising a battery power source located within the circular housing.

7. The illumination system of claim 1, wherein the illumination system is wirelessly controlled by a control device.

8. The illumination system of claim 1, further comprising a mute switch located along the side wall, wherein the mute switch is configured to turn on or turn off the audio signal.

9. The illumination system of claim 1, wherein the light source comprises a light emitting diode (LED).

10. The illumination system of claim 1, wherein the light source emits light according to a pulse width modulation signal.

11. The illumination system of claim 1, wherein the plurality of motion sensing components trigger the light source to emit light through the diffusing lens when any one of the plurality of motion sensing components is triggered.

* * * * *